(12) United States Patent
Van Den Brink

(10) Patent No.: US 10,513,359 B2
(45) Date of Patent: Dec. 24, 2019

(54) APPARATUS FOR RECEIVING AND TRANSPORTING A STREAM OF EGGS

(71) Applicant: MOBA GROUP B.V., Barneveld (NL)

(72) Inventor: Hendrik Van Den Brink, Kootwijkerbroek (NL)

(73) Assignee: MOBA GROUP B.V., Barneveld (NL)

(*) Notice: Subject to any disclaimer, the term of this patent is extended or adjusted under 35 U.S.C. 154(b) by 0 days.

(21) Appl. No.: 15/767,922

(22) PCT Filed: Oct. 14, 2016

(86) PCT No.: PCT/NL2016/050707
§ 371 (c)(1),
(2) Date: Apr. 12, 2018

(87) PCT Pub. No.: WO2017/065610
PCT Pub. Date: Apr. 20, 2017

(65) Prior Publication Data
US 2018/0305051 A1 Oct. 25, 2018

(30) Foreign Application Priority Data
Oct. 15, 2015 (EP) .................................... 15002935

(51) Int. Cl.
*B65B 23/08* (2006.01)
*A01K 31/16* (2006.01)
(Continued)

(52) U.S. Cl.
CPC ............ *B65B 23/08* (2013.01); *A01K 31/165* (2013.01); *A01K 43/005* (2013.01); *B65G 47/32* (2013.01);
(Continued)

(58) Field of Classification Search
CPC ...... B65G 29/02; B65G 47/32; B65G 47/841; B65G 47/842; B65G 47/846;
(Continued)

(56) References Cited

U.S. PATENT DOCUMENTS 4,036,355 A * 7/1977 Valli .................... A01K 31/165
198/607
4,519,494 A * 5/1985 McEvoy ................ A01K 43/00
198/432
(Continued)

FOREIGN PATENT DOCUMENTS

EP 1894863 3/2008
GB 1535261 12/1978
(Continued)

OTHER PUBLICATIONS

International Search Report for PCT/NL2016/050707, dated Jan. 27, 2017.
(Continued)

*Primary Examiner* — Gene O Crawford
*Assistant Examiner* — Keith R Campbell
(74) *Attorney, Agent, or Firm* — Marvin Petry; Stites & Harbison PLLC

(57) ABSTRACT

An apparatus for receiving and transporting a stream of eggs, comprising,
a conveyor for transporting eggs in a transport direction T,
a releasing device connected with the conveyor, for releasing predetermined eggs away from the conveyor, separately, downwardly out of the stream,
a guide for receiving and taking over such an egg from the releasing device and guiding it to an egg processing apparatus, and
two driven star wheels placed substantially close to each other, with shafts perpendicular to T, and with opposite
(Continued)

Figure 1:
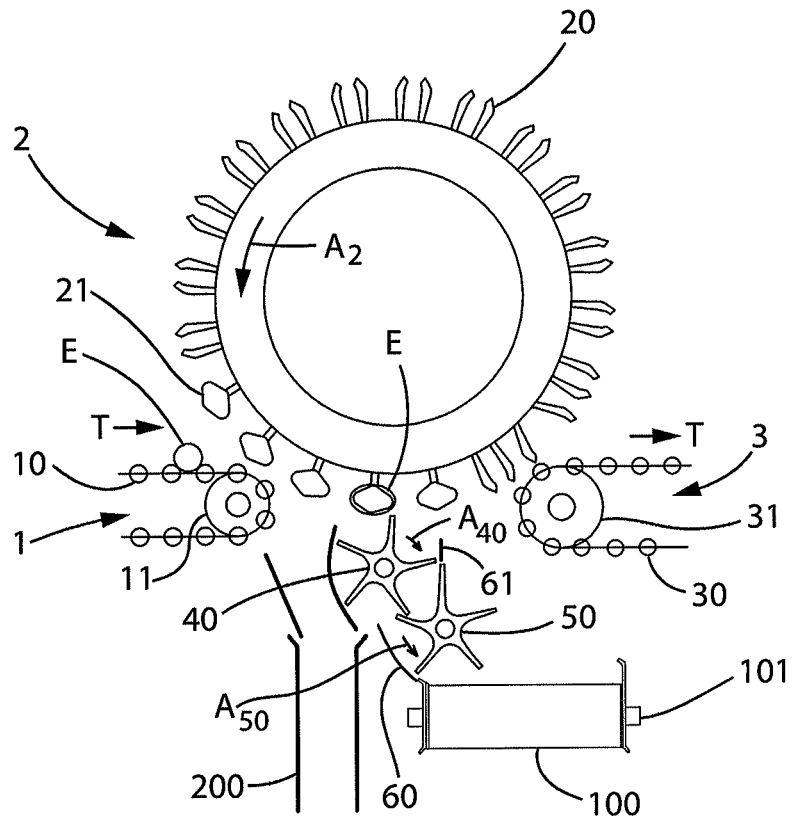

directions of rotation of the shafts, while upon rotation their blades along a part of the rotation path are placed over each other and transport the eggs substantially cupwise downwardly.

In a suitable manner, with this apparatus, for example intact but dirty eggs can be released from a sorting stream and be received for further handling or processing.

20 Claims, 1 Drawing Sheet

(51) Int. Cl.
    *A01K 43/00*     (2006.01)
    *B65G 47/32*     (2006.01)
    *B65G 47/86*     (2006.01)
(52) U.S. Cl.
    CPC ......... *B65G 47/842* (2013.01); *B65G 47/847* (2013.01); *B65G 2201/0208* (2013.01)
(58) Field of Classification Search
    CPC .......... B65G 47/847; B65G 2201/0208; B65B 23/08; A01K 31/165; A01K 43/00; A01K 43/005
    USPC .......................................................... 198/534
    See application file for complete search history.

(56) References Cited

U.S. PATENT DOCUMENTS

| | | | |
|---|---|---|---|
| 4,730,440 A | 3/1988 | van der Schoot et al. | |
| 5,167,317 A * | 12/1992 | van der Schoot | A01K 43/00 198/469.1 |
| 5,749,453 A * | 5/1998 | Doornekamp | B65B 23/06 198/400 |
| 6,234,300 B1 * | 5/2001 | De Vos | B07C 5/18 198/370.03 |
| 6,446,784 B1 * | 9/2002 | Veldhuizen | B65B 23/08 198/394 |
| 6,742,647 B2 | 6/2004 | De Greef | |
| 7,428,961 B2 * | 9/2008 | Temming | B65B 23/06 198/608 |
| 7,926,664 B2 * | 4/2011 | De Vlaam | A01K 43/00 209/513 |
| 2008/0217216 A1 | 9/2008 | De Vlaam | |

FOREIGN PATENT DOCUMENTS

| | | |
|---|---|---|
| JP | S62105816 | 5/1987 |
| JP | 2011143939 | 7/2011 |
| WO | WO-2011129698 | 10/2011 |

OTHER PUBLICATIONS

Written Opinion of the International Searching Authority for PCT/NZ2016/050707, completed Jan. 7, 2017.

Chinese Office Action, Application No. 201680060620.1, dated May 21, 2019, 12 pages.

* cited by examiner

APPARATUS FOR RECEIVING AND TRANSPORTING A STREAM OF EGGS

The present invention relates to an apparatus including:
a conveyor for transporting eggs in a transport direction T,
a releasing device connected with the conveyor, for releasing predetermined eggs away from the conveyor, separately, downwardly out of the stream, and
a guide for receiving and taking over such an egg from the releasing device and guiding it to an egg processing apparatus.

Such an apparatus is known from, for example, U.S. Pat. No. 4,519,494. In this document it is described how eggs are released from grippers in predetermined positions above brushes rotating in mutually opposite directions, which, after receiving the eggs, guide them to a conveyor arranged underneath. As is indicated, the brushes overlap each other by a small distance. In a variant, one of the brushes is replaced with a guide plate with matching curvature. With these brushes, the drop of each egg is broken, such that under the usual operating conditions no fracture occurs. A great disadvantage of this apparatus is the large amount of space that is taken up by these brushes which in practice have a diameter of about 25 cm. A further drawback is the soiling of the brushes, with the dirt collected between all the bristles being difficult to remove.

Another example where eggs are released from a stream of eggs is described in EP1871670, in which a rotating drum with grippers picks up eggs from a first roller conveyor and transfers them to a next roller conveyor. This drum constitutes an important link in the whole process of sorting and packing eggs. Prior to this drum the eggs are washed and inspected, while after it the eggs are guided to their definitive destination. This drum fulfills two functions so far. Firstly, the grippers in the drum are operated such that all eggs are turned so as to have their tip oriented in the same direction in order that in the downstream path, and especially in the packing of the eggs, they can be placed with their tip down, into nests of cartons or trays. Secondly, from the grippers of this drum, eggs with a fault are removed. Such removal means the opening of the grippers at some point during this path of transfer, whereby these faulty eggs fall down freely and end up in a chute. Eggs are regarded as being faulty if, for instance, they exhibit a fracture, an open fracture, or a dent. These eggs, as far as still largely intact, will mostly perish.

However, among the eggs that are not released and discharged during this transfer, there may still be dirty eggs that are not suitable to be packed. These eggs are returned to be washed once again, but must then follow the further path together with the eggs approved and conventionally classified S, M, L, LX. Typically, these dirty eggs are collected on, for example, a packing belt especially intended for that purpose, then to be processed anew from scratch in the sorting process in order to be accordingly passed through the washer anew. This process of handling these so-called rewash eggs is laborious, and requires many additional measures in the system of such a sorting machine.

To remedy this shortcoming the apparatus according to the invention furthermore comprises two driven star wheels with parallel shafts perpendicular to the transport direction T, and the direction of rotation of the shafts, viewed in the direction thereof, being clockwise for the left one and counterclockwise for the right one, while upon rotation their blades along a part of the rotation path are placed over each other and transport the eggs substantially cupwise downwardly.

With great advantage, now, at the right location in the sorting and packing process, eggs that, apart from being dirty, are suitable for further processing can be temporarily removed from this process to be washed anew. In a suitable manner, with this apparatus, for example, intact but dirty eggs can be released from a sorting stream and be received for further handling or processing.

The highly suitable compact solution with blades moreover provides an excellent opportunity for cleaning, precisely there where the not-yet-entirely-clean eggs pass and germs may be spread.

It is known from JP 2011143939 to transport products downwardly by means of receiving and relocation with star wheels which are arranged with their shafts parallel, and next to each other. These star wheels each have a same number of blades or vanes and rotate in opposite senses, the rotation being so configured that at regular intervals, of each star wheel the blades meet each other at the same time and with a small interspace stand alongside and thus constitute a carrier surface. In this position, a product is brought onto said carrier surface, for example by a conveyor belt with a transport direction parallel to the star wheel shafts, and just above, and in the direction of, the carrier surface. As soon as the product, for example a consumer unit box, lies on this carrier surface, the star wheels rotate further and the box falls down into, for example, a so-called outer box. Such an apparatus is not suitable to guide fragile eggs, which clearly have a different shape than that of rectangular boxes, downwardly along a flowing path.

In WO2011129698 an apparatus for transporting eggs downwardly is described, in particular the exemplary embodiment according to FIG. 4. In such an apparatus the eggs are supplied with a conveyor, are oriented in the right direction, and transferred to a transport guide which leads the eggs downwardly to a tray and in this manner fills up a tray row after row. The transport guide is a combination of two juxtaposed conveyors which each with gripper halves clamp an egg during the downward path between these conveyors. This transport guide is not suitable to receive the comparatively uncontrolledly released eggs between the gripper halves. Moreover, this rather complex construction requires a lot of space.

Especially advantageous embodiments of the present invention comprise:
that the star wheels are positioned one above the other;
that at least a single guide plate is included, arranged near the circumferential path with radius R of the star wheel that is arranged in the downward path closest to the egg processing apparatus;
that the star wheels are equal size;
that such a star wheel comprises star wheel blades whose centerlines extend radially;
that such a star wheel comprises star wheel blades whose centerlines are displaced over a distance r relative to the center;
that for such a star wheel blade, an angle $\phi$, according to $r/R = \sin \phi$, is in the range of $0° < \phi < 20°$;
that the conveyor comprises a roller conveyor having in the transport direction T at least a single row of successive rollers perpendicular to the transport direction T, while the star wheels with star wheel blades have a width that corresponds to the at least single row; and/or
that the star wheel blades along this width are divided into segments in accordance with the number of rows.

Below, the invention will be further elucidated on the basis of a drawing, showing in FIG. 1 a schematic side view of an example of an apparatus according to the invention, and showing in FIG. 2 a cross sectional view of a non-limiting example of a star wheel according to the invention, taken perpendicular to the shaft thereof.

In the different FIGURES the same parts or indications are numbered or denoted the same way.

Figure 2:
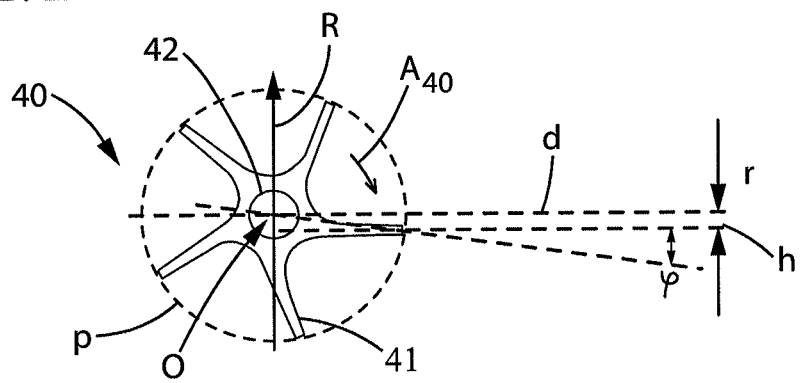

FIGS. 1-2 show an example of an apparatus for receiving and transporting a stream of eggs E. The apparatus comprises a conveyor 1 for transporting the eggs E in a transport direction T. The conveyor 1 is associated with a releasing device 2 (placed downstream of conveyor 1) which is configured, for one thing, for releasing (in this case dropping) predetermined eggs E away from the conveyor, separately, in a downward direction out of the stream. A guiding device (i.e. receiving device) is provided for receiving and taking over such a (released) egg E from the releasing device and carrying the egg E over to a discharge conveyor 100 (in this example a discharge belt conveyor) of an egg processing apparatus.

With great advantage, there are provided two driven star wheels 40, 50 placed substantially close to each other, which in this example form the receiving device. The star wheels 40, 50 have parallel rotation shafts, which are perpendicular to the transport direction T (see FIG. 1). The respective directions of rotation of these shafts, viewed in the direction thereof (at least, in the side view represented), are opposite to each other, the shaft of the first star wheel 40 (i.e. upstream, left in the drawing) rotating clockwise and the shaft of the second star wheel 50 (i.e. downstream, right in the drawing) rotating counterclockwise. In this example, a rotation shaft of the releasing device 2 (in this case positioned above the star wheels 40, 50) rotates in the same direction of rotation A2 as the rotation direction A50 of the second star wheel 50. The two star wheels 40, 50 are so configured that upon rotation their blades along a part of the rotation path are placed over each other (i.e. overlap each other radially) and transport the eggs E substantially cupwise downwardly. In particular, the star wheels 40, 50 during rotation can form egg-receiving, mutually cooperating cups to receive eggs E released by the releasing device and move them downwardly in a controlled manner, along a path of bends with relatively weak bends.

As shown in particular in the schematic side view of the exemplary embodiment according to FIG. 1, eggs E are supplied with a roller conveyor 1, with rollers 10 and driving wheel 11, for transfer to a roller conveyor 3, with rollers 30 and driving wheel 31, with a transport direction T for the eggs E for supply and discharge respectively. Such roller conveyors are generally known in food technology and are widely applied, see for example EP1094700 in which further details of such egg transport are elucidated.

The eggs E are transported between these conveyors 1, 3, viz. taken up and transferred, by a drum 2 functioning as releasing device, having a direction of rotation A2, and having grippers 20, 21 depicted in two respective positions of these grippers.

As mentioned above, this drum 2 fulfills multiple functions in this example, viz.:
 taking up the eggs E from the conveyor 1 and turning them in the right direction before transferring the eggs E to conveyor 3,
 the (optional) release of faulty eggs E into a discharge chute 200, and
 a third function, the release of eggs E (on a discharge track 40, 50, 100), in particular eggs E which are intact and dirty and, for example, are to be returned to a washing station or the like. To those skilled in the art, it will be clear that this third function can be generally applied for any well-defined grading of eggs.

Besides involving dirt, this can also involve, for example, an odd dimension, minor fracture, or also certain color features.

At pick-up from the conveyor 1, the eggs E are taken over as described in EP1871670, where the grippers 21 are rotated through a quarter stroke.

According to an aspect of the present invention, these intact and dirty eggs are guided down by means of two star wheels 40, 50 to a discharge conveyor 100, represented with discharge conveyor shaft 101.

Also indicated are the directions of rotation of the star wheels 40, 50, viz. A40, A50, the left one rotating clockwise (as seen in the side view), also referred to as cyclonic, and the right one rotating the other way around, also referred to as anticyclonic. In FIG. 2 such a star wheel, viz. the cyclonically rotating star wheel 40, is shown in more detail, with star wheel blades or vanes 41, and with shaft hole 42, in which a shaft connected to a drive (not represented) is mounted.

To transfer the intact and dirty eggs without damage onto the discharge conveyor 100, these star wheels 40, 50 are arranged obliquely above each other, whereby the blades of these two star wheels along a part of the respective transfer path support such an egg as if they form a cup together, and hence also provide for cupwise, or also handwise, movement and transfer. To prevent possible movement away from the downward path, more particularly, off the slope of a blade, there are additionally arranged two guide plates 60, 61, upstream a first guide plate 61 (for cooperation with the opposite first star wheel 40), and downstream a second guide plate 60 (for cooperation with the opposite second star wheel 50).

Further details of a preferred embodiment of such a star wheel 40, 50 are explained with reference to FIG. 2.

Denoted with p is the circumference of the circular path (with radius R around a center O) that is followed by the blades or vanes upon rotation in the respective direction of rotation A40. Arrow R indicates in particular the radius of the star wheel 40 (i.e. the distance between the center O and the radial ends of the blades 41). A diameter d (horizontal in this drawing) is shown which passes through a center O (i.e. center of the respective rotation shaft) and is parallel with a centerline h of one of the blades (41). For each of the blades such a virtual diameter can be drawn in (a centerline of each blade running parallel to the associated diameter).

In the present, especially advantageous design, centerlines of the blades do not intersect the center O of the star wheel. It follows from the drawing, in particular, that the centerline h of the relevant blade 41 is displaced over a (substantially tangential) distance r relative to the origin O (i.e. relative to the respective diameter d). With the lines drawn, the following can be written: $\sin \phi = r/R$, wherein $\phi$ is a displacement angle of the respective blade 41.

During use, with the blades 41 thus positioned, the eggs E, upon release, can be received, egg after egg, by the first star wheel 40 in the space between two blades (which, in this implementation with five blades, include a mutual angle of 72° seen in the side view). Thereupon, the egg lying in such a cavity will be carried along with the rotating star wheel 40 without appreciable additional movement, to end up at some point in a cavity between the first star wheel 40 and the second star wheel 50 and thus be carried along handwise or cupwise between the two blades moving over each other and rotating downwardly there.

To prevent such egg thereupon moving away from between the blades, the earlier-mentioned guide plate 60 is arranged along an appreciable part of the circumferential path of the second star wheel 50. The second star wheel 50 and the guide plate 60 deliver the egg to the discharge conveyor 100 for further processing.

have the releasing device transfer defined eggs to the star wheels 40, 50 (by releasing the eggs in a suitable position above the first star wheel 40) and not transfer other eggs to the star wheels (e.g. approved eggs, for discharge via discharge conveyor 3, and broken eggs, for discharge via discharge chute 200).

| KEY TO SYMBOLS | | | |
|---|---|---|---|
| 1 | feeding conveyor | E | egg |
| 10 | rollers | T | (main) transport direction |
| 11 | driving wheel | A2 | direction of rotation drum 2 |
| 2 | drum | A40 | direction of rotation star wheel 40 |
| 20 | gripper - empty | A50 | direction of rotation star wheel 50 |
| 21 | gripper - path of conveyor | O | origin of circular path star wheel blades |
| 3 | discharge conveyor | d | diameter |
| 30 | rollers | R | radius |
| 31 | driving wheel | p | path circumference |
| 40 | first star wheel | h | centerline of star wheel blade |
| 41 | star wheel blade or vane | r | displacement relative to O |
| 42 | shaft hole | φ | displacement angle |
| 50 | second star wheel | | |
| 60 | guide plate | | |
| 61 | guide plate | | |
| 100 | discharge (belt) conveyor | | |
| 101 | discharge (belt) conveyor shaft | | |
| 200 | discharge chute | | |

It has been found that the blades with the centerline arranged off-center provide the advantage that as soon as the downward movement for an egg starts, the egg, when compared with a centerline along the radius, is already disposed a bit lower, viz. by the distance r. Thus, by comparison, the egg will start rolling outwardly over the rotating star wheel blade a bit later and especially in the path with the second guide plate 60 will need the guidance thereof later. This allows the length of this guide plate 60 in this narrow space to be limited in a suitable manner.

It has been found that in the above-described manner a safe and sound transfer of each successive egg E between the drum 2 and the discharge conveyor 100 is obtained.

The conveyor 1 may also be referred to as a first conveyor section, the conveyor 3 may be referred to as a second conveyor section, the spaces between the vanes on each star wheel may be referred to as recesses and where vanes of the two star wheels overlap and touch each other, as shown in FIG. 1, may be referred to as downwardly closed cup-like recess.

To those skilled in the art it will be clear that the invention is not limited to the exemplary embodiments as described in detail hereinabove. Diverse modifications are understood to fall with the scope of protection of the appended claims.

For example, the above-mentioned conveyor 1 may comprise a roller conveyor having in the transport direction T at least a single row of successive rollers perpendicular to the transport direction T, while the star wheels with star wheel blades have a width that corresponds to the at least single row.

More particularly, along the above-mentioned width the star wheel blades are divided into segments in accordance with the number of rows.

In a further implementation, such segment includes, for example on one side, an upstanding edge to further avoid rolling away in a direction other than downward. Further, for the artisan of ordinary skill it will be clear that the apparatus may be provided with, for example, a suitable control (e.g. controller, computer, processor, or the like) for controlling one or more components. The control may be configured, for example, for controlling the releasing device, in particular to

The invention claimed is:

1. An apparatus for receiving and transporting a stream of eggs, comprising:
   a conveyor which transports eggs in a transport direction,
   a releasing device positioned to receive eggs from a first conveyor section and transfer the eggs to either a second conveyor section or downwardly into a discharge track,
   the discharge track comprising upper and lower star wheels mounted to rotate about parallel axes which are perpendicular to the transport direction, and
   each star wheel having vanes and a recess between the vanes, wherein the vanes of each star wheel, upon rotation, enter into spaces between the vanes of the other star wheel, such that along a part of the rotational path of each of the two star wheels, vanes of the upper star wheel and vanes of the lower star wheel overlap to form a downwardly closed cup-like recess which carries eggs from the upper star wheel to the lower star wheel, after which the lower star wheel carries the eggs downwardly.

2. The apparatus according to claim 1, wherein the releasing device is also constructed to transfer eggs to a downward chute upstream from the discharge track.

3. The apparatus according to claim 1, wherein the axis of the lower star wheel is located closer in the transport direction to the second conveyor section than is the axis of the first star wheel.

4. The apparatus according to claim 1, wherein a guide plate is arranged near the circumferential path of the lower star wheel adjacent that part of the lower star wheel path where the lower star wheel carries eggs downwardly.

5. The apparatus according to claim 1, wherein the star wheels are of equal diameter.

6. The apparatus according to claim 1, wherein the centerlines of the vanes of the star wheels extend radially.

7. The apparatus according to claim 6, wherein the vanes of the star wheels have centerlines which are displaced over a distance r relative to the centerlines of the vanes.

8. The apparatus according to claim 7, wherein for eac of the vanes of the star wheels, an angle φ, according to r/R=sin φ, is in the range of 0°<φ<20°, with R being a radius of each star wheel.

9. The apparatus according to claim 1, wherein the conveyor is a roller conveyor having in the transport direction at least a single row of successive rollers extending perpendicular to the transport direction and wherein the star wheel vanes have a width perpendicular to the transport direction that is equal to the length of the single row perpendicular to the transport direction.

10. The apparatus according to claim 9, wherein the vanes, along their widths, are divided into segments equal to the number of rows of successive rollers.

11. The apparatus according to claim 1, wherein the conveyor is a roller conveyor.

12. The apparatus according to claim 1, wherein the releasing device includes a drum having grippers which grip eggs from the first conveyor section, and which has a direction of rotation such that the lower part of the drum carries eggs in the transport direction from the first conveyor section to the second conveyor section.

13. The apparatus according to claim 12, wherein the releasing device is configured to transfer approved eggs from the first conveyor section to the second conveyor section and for releasing predetermined eggs away from the conveyor into the discharge track.

14. The apparatus according to claim 13, wherein the second conveyor section is a belt conveyor.

15. The apparatus according to claim 13, wherein the second conveyor section is a roller conveyor.

16. The apparatus according to claim 1, including a first, upstream guide plate located adjacent the upper star wheel for cooperation with the upper star wheel, and a second, downstream guide plate adjacent the lower star wheel for cooperation with the lower star wheel.

17. The apparatus according to claim 1, wherein the releasing device is configured to deliver dirty intact eggs to the discharge track.

18. The apparatus according to claim 1, including an egg processing apparatus below the lower star wheel and positioned to receive eggs carried downwardly by the lower star wheel.

19. The apparatus according to claim 1, wherein the releasing device is also constructed to transfer eggs to a downward chute upstream from the discharge track and wherein the releasing device is configured to release faulty eggs into the downward chute.

20. The apparatus according to claim 1, including a first guide plate positioned adjacent the upper star wheel for guiding eggs downwardly, a second guide plate located adjacent the lower star wheel for guiding eggs carried by the lower star wheel downwardly and a third guide plate on the side of the upper star wheel opposite from the first guide plate.

* * * * *